United States Patent [19]
Prior et al.

[11] Patent Number: 5,805,282
[45] Date of Patent: Sep. 8, 1998

[54] METHOD AND APPARATUS FOR COHERENCE OBSERVATION BY INTERFERENCE NOISE

[75] Inventors: Yehiam Prior; Opher Kinrot; Eliyahu Averbukh, all of Rehovot, Israel

[73] Assignee: Yeda Research and Development Co. Ltd., Rehovot, Israel

[21] Appl. No.: 629,074

[22] Filed: Apr. 8, 1996

[30] Foreign Application Priority Data

Apr. 10, 1995 [IL] Israel ......................................... 113311

[51] Int. Cl.⁶ ....................................................... G01B 9/02
[52] U.S. Cl. ............................................................ 356/345
[58] Field of Search .................................... 356/345, 346, 356/353; 250/458.1, 459.1, 461.1

[56] References Cited

U.S. PATENT DOCUMENTS

| 4,741,620 | 5/1988 | Wickramasinghe . | |
|---|---|---|---|
| 5,131,748 | 7/1992 | Monchalin et al. . | |
| 5,191,614 | 3/1993 | LeCong . | |
| 5,459,570 | 10/1995 | Swanson et al. | 356/345 |
| 5,589,936 | 12/1996 | Uchikawa et al. | 356/345 |

OTHER PUBLICATIONS

Noise Power Spectra of Optical Two–Beam Interferometers Induced by the Laser Phase Noise, Behzad Moslehi, Journal of Lightwave Technology, Nov. 1986, pp. 1704–1710.

"Monomode Optical Fiber Interferometers", Jackson, Journal of Physics E. Scientific Instruments, Dec. 1985, p. 985.

*Primary Examiner*—Samuel A. Turner
*Attorney, Agent, or Firm*—Darby & Darby

[57] ABSTRACT

The invention provides a method for performing interference measurements by observation of interference noise, including the steps of splitting an energy beam from an energy source into two beams directed into two different arms of an interferometer; using variable delay-generating means to introduce a path difference between the two arms; introducing a variable phase difference between the two arms, and recombining the two energy beams into a single beam. There is also provided an apparatus including a beam splitter in which an energy beam from an energy source is split into two arms, a variable delay unit in which a variable delay is imposed on one of the two arms, a constant delay unit imposing a constant delay on the other one of the two arms, and a recombiner in which the two arms are recombined to form a single output beam. A phase randomizer is interposed between the constant delay unit or the variable delay unit and the recombiner, to introduce a variable phase difference between the two arms.

18 Claims, 3 Drawing Sheets

METHOD AND APPARATUS FOR COHERENCE OBSERVATION BY INTERFERENCE NOISE

The present invention relates to a method and apparatus for performing interference measurements by observation of interference noise, or generally, Coherence Observation by Interference Noise (hereinafter, "COIN"). It further relates to the use of COIN for the measurement of light source autocorrelation and for the measurement of spectra.

Interference is a well-documented phenomenon in physical optics and interferometry, based on interference, has many practical applications such as the precise measurement or comparison of wavelengths, the measurement of very small distances of translation, or thicknesses, the detection of disturbances or inhomogeneities in optical media, the determination of refractive indices of materials, etc.

The design and working principle of a conventional interferometer, such as the Michelson interferometer, is presumed to be known: a light beam is split into two, and the two beams are made to traverse optical paths of different lengths before being recombined into a single output beam or onto a detector. The interference pattern is observed as a function of the optical path difference between the two arms, providing information about the mechanism producing the optical path difference. Yet while conventional interferometry is extremely accurate and sensitive, it is this very sensitivity to the stability (or rather, the lack thereof) of the relative phases of the two beams which imposes on any interferometric apparatus demands of rigidity and general mechanical perfection of such stringency that one tends to avoid interferometric measurements whenever possible.

It is thus one of the objects of the present invention to provide an interferometric method and apparatus that, while not less accurate and versatile than the conventional methods, is not affected by mechanical imperfections, and does not require a high degree of relative phase stability.

According to the invention, the above object is achieved by providing a method for performing interference measurements by observation of interference noise, comprising the steps of splitting an energy beam from an energy source into two beams directed into two different arms of an interferometer; using variable delay-generating means to introduce a path difference between said two arms; introducing a variable phase difference between said two arms, and recombining said two energy beams into a single beam.

The invention further provides an apparatus for performing interference measurements by observation of interference noise, comprising a beam splitter in which an energy beam from an energy source is split into two arms; a variable delay unit in which a variable delay is imposed on one of said two arms; a constant delay unit imposing a constant delay on the other one of said two arms; a recombiner in which said two arms are recombined to form a single output beam; characterized in that a phase randomizer is interposed between said constant delay unit or said variable delay unit and said recombiner to introduce a variable optical phase difference between said two arms.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
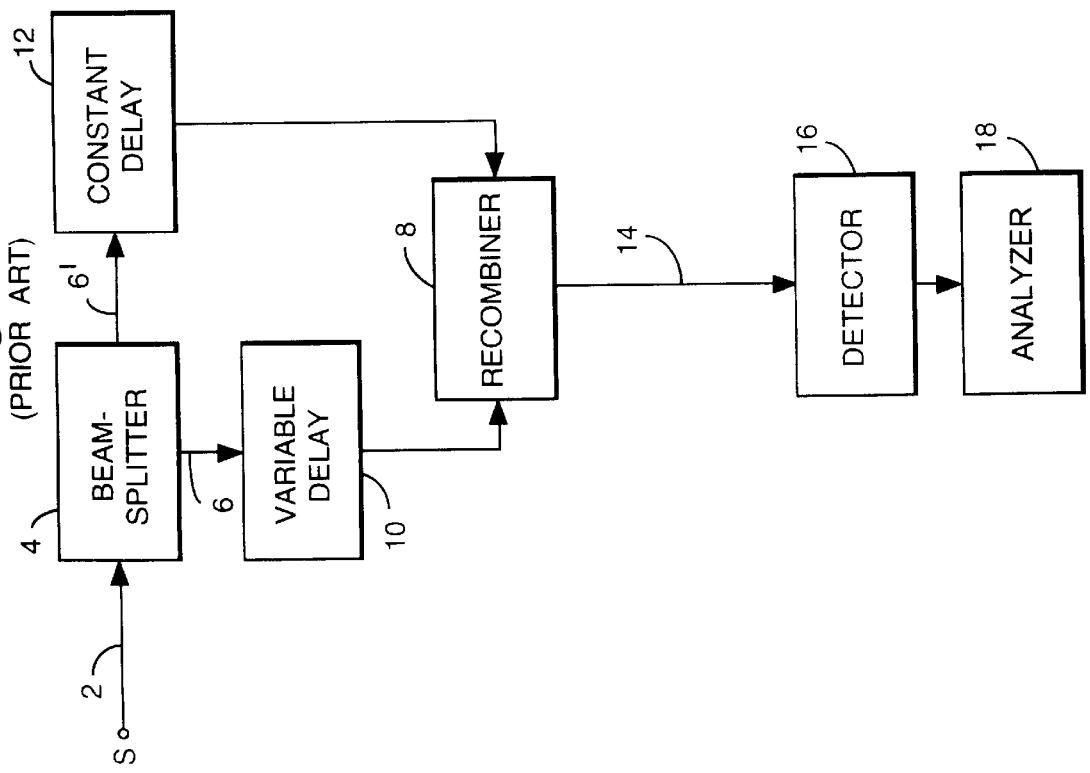
FIG. 1 is a block diagram of a conventional interferometer.

Referring now to the drawings, there is seen in FIG. 1 a schematic block diagram of a conventional interferometer, in which a beam 2 from a light source S is split by a beam splitter 4 into two arms 6, 6', one of which, 6, reaches a recombiner 8 via a variable delay unit 10; the other, 6', is led to the recombiner 8 via a constant delay unit 12. In the recombiner 8 the two arms 6, 6' are superposed, producing an output interference signal 14, the intensity of which is measured at the detector 16 as a function of the relative phases between the arms and, if one arm is of a fixed length, as a function of the optical path length difference of the variable arm. The signal is then analyzed in an analyzer 18.

Figure 2:
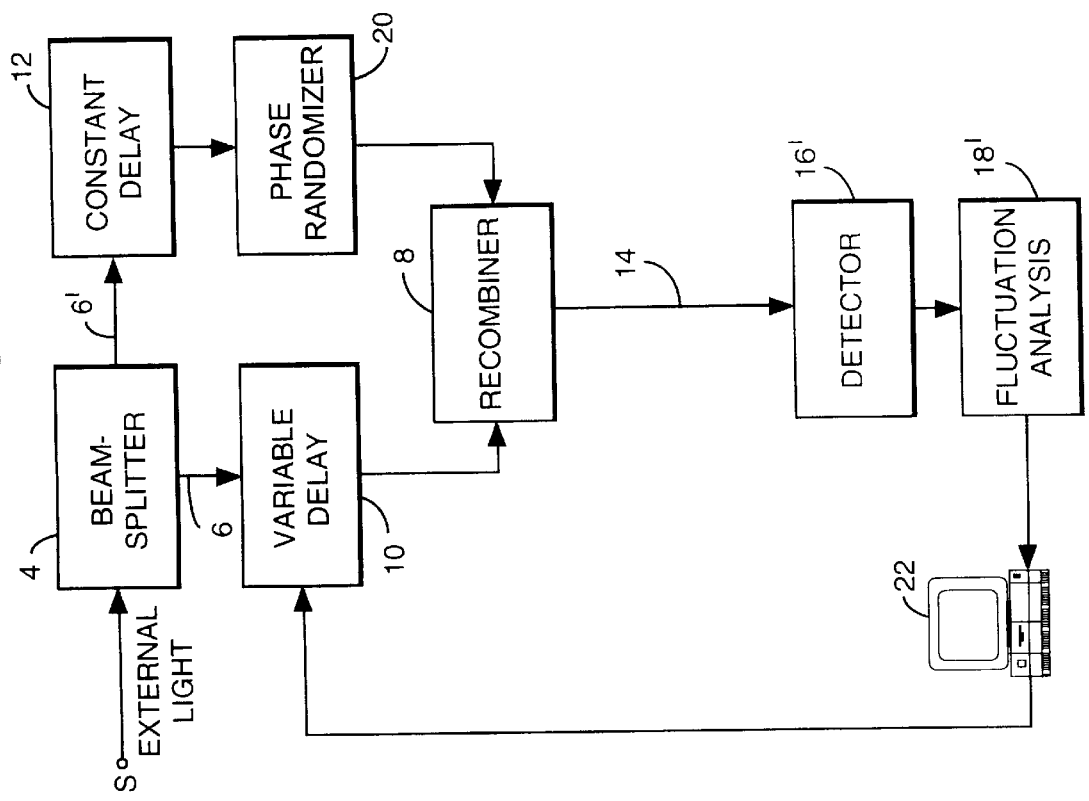
FIG. 2 represents a block diagram of a COIN interferometer as used for the measurement of light source autocorrelation.

The COIN interferometer, i.e., the interferometer based on the COIN method, differs from the conventional interferometer in that a new element, a "phase randomizer" 20 has been added to one arm of the split beam, providing a random phase (between 0 and $2\pi$), as can be seen in FIG. 2 (which is actually a block diagram representing a first embodiment of the invention, with elements having similar functions to those shown in FIG. 1 carrying the same reference numerals). A further difference is that the measured quantity is not the intensity of the interference signal, but rather the fluctuations in the intensity. These fluctuations are statistically analyzed, namely, a statistical measure of the noise (e.g., the variance) is derived, which is related to the interference fringe contrast for any given optical path difference between the two arms.

The random phase is produced either by a dedicated unit, or by controlled or uncontrolled environmental fluctuations originating within or outside of the interferometer itself, or by one or more components of the system, other than a dedicated phase randomizer.

While in FIG. 2 the phase randomizer 20 is seen to be interposed between the constant delay unit 12 and the recombiner 8, it could equally well be interposed between the latter and the variable delay unit 10.

The COIN method may be used for characterizing the light itself, or may be used for characterizing a medium with which the light is interacting. In the first case, the COIN method is used for the determination of the source autocorrelation, while in the second case, the method is used for measuring medium spectra, such as emission, absorption, or Raman spectra.

The standard tool for autocorrelation measurements is a Michelson interferometer, where, as already mentioned, an incoming beam of light is split in two parts by a beamsplitter, the two parts being recombined after traversing different optical paths, and the resulting output interference signal being measured by a detector. Optical path difference is translated directly into time delay between the two recombined beams. For a pulsed input light beam, having some optical center frequency, the resulting interference signal will have fast oscillations at the optical frequency period, with an envelope that is the autocorrelation of the input pulse amplitude envelope function. In an interferometer modified according to the invention, the additional random relative phase will cause the disapppearance of the fast oscillations, converting them to intensity fluctuations. The average of the output signal will be constant, but the magnitude of its fluctuations will depend on the modulation depth at any given time delay, i.e., the difference in intensity between the nearest constructive interference peak and destructive interference trough, revealing the envelope function of the interference fringes. Thus, by looking at any statistical measure of the 'noise' output from the COIN interferometer (e.g., the variance), the modulation depth of the interference can be measured. The information obtained in this way is the square of the envelope autocorrelation function (with the autocorrelation function of any function describing the general dependence of the values of the data at one time on the values of these data at another time).

In the block diagram of FIG. 2, the fluctuations are analyzed in the analyzer 18', the output of which is fed to a computer 22, which also controls the variable delay 10.

Figure 3:
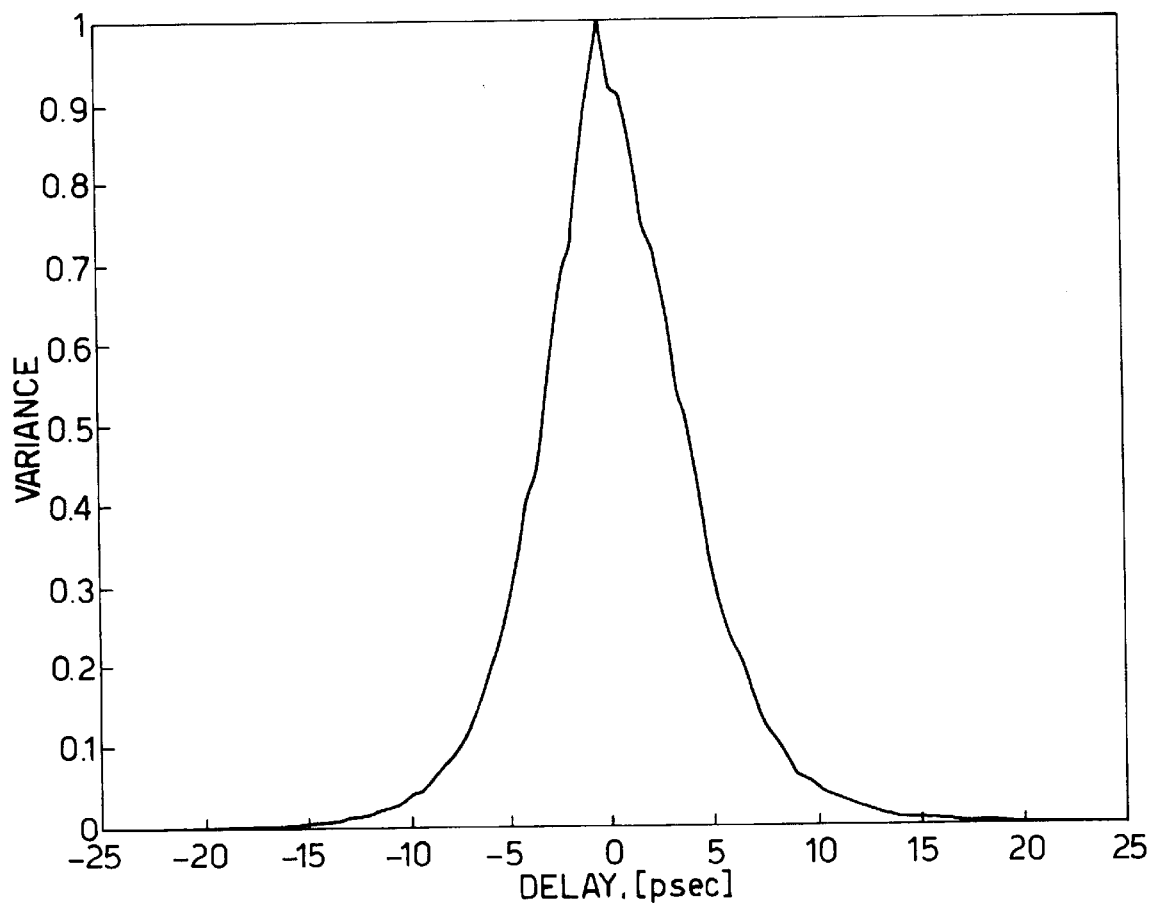
FIG. 3 shows the results of measuring the autocorrelation of a short pulse.

FIG. 3 illustrates the result of a measurement of the autocorrelation of a short laser pulse by the arrangement of FIG. 2. The diagram shows the variance as a function of delay.

The autocorrelation measurement may be performed on a two-color light source, where one color is the unknown light and the other is light from a source of known wavelength (e.g., a HeNe laser), internal or external to the measurement device. From the interference pattern of the two-color source, the wavelength of the unknown source may be extracted.

Figure 4:
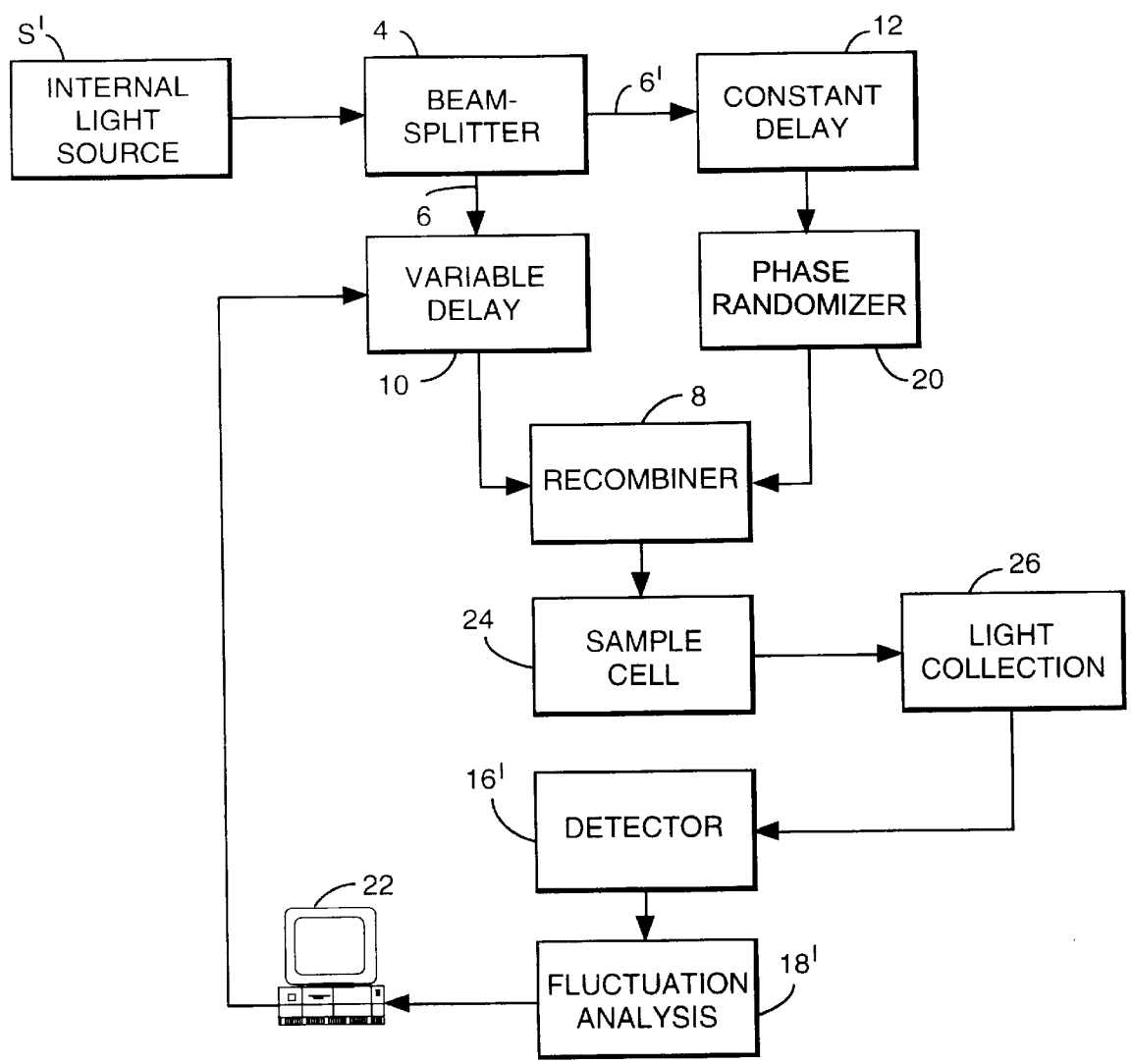
FIG. 4 shows a block diagram of a COIN interferometer as used for the measurement of emission spectra.

FIG. 4 shows the block diagram of a COIN interferometer as used as a spectrometer. The differences with respect to the block diagram of FIG. 2 are obvious and self-explanatory. The light source S' is part of the instrument, with the recombined beam being led into a sample cell 24, and the fluorescence generated therein being collected by a light collector 26, from which the light reaches the detector 16'.

The light sources S and S' can be a pulsed or continuous laser, an incandescent bulb or other incoherent source, or light originating in several independent light sources (coherent or incoherent).

As known, when an atom (molecule) is excited from its ground state by a pulse of light, a certain quantum amplitude of the excited states is created. If a delayed second pulse is applied, the total population of the excited states is determined by the interference of two quantum amplitudes. The result of the interference is determined both by the system evolution during the delay period, and by the relative phase between the two pulses.

COIN spectrometers, as outlined in FIG. 4, are based on the introduction of a random relative phase between the pair of excitation pulses, and the observation of the total fluorescence, or of the transmitted signal intensity through the sample, after each event, where an event is the excitation by one or more pairs of pulses of the same relative phase at a given delay. While in the following example fluorescence will be referred to, this term should be understood in a more general context of fluorescence or absorption as measured by the transmitted energy. At zero delay, the interference may be either fully constructive, or fully destructive, or anything in between, causing large intensity fluctuations of the fluorescence. For two identical input pulses, the emitted energy will fluctuate between zero and four times the emission produced by a single pulse. For very long delay time between the pulses, dephasing processes in the medium will destroy the interference, and the observed fluorescence will be twice the emission produced by a single pulse, with no fluctuations. For delays between zero and full separation, the second pulse encounters an atom (molecule) whose coherence is modified both by the internal dynamics and by coherent dephasing processes. As long as the atom maintains its coherence, the total population of the excited state is still affected by the quantum interference. The total fluorescence intensity will fluctuate having a noise level that depends upon the delay. This gradually decreasing interference noise provides the same time-resolved information as in the case where the phases of the two pulses are locked together but, as already mentioned, measurement using the COIN system does not pose the severe demands concerning rigidity of the mechanical structure of the instrument and protection against thermal effects.

Figure 5:
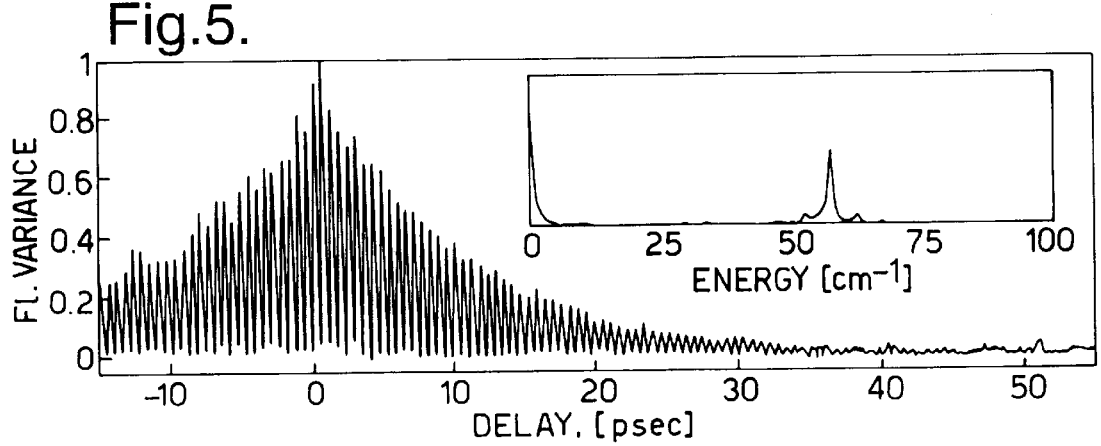
FIG. 5 shows the results of measuring fluorescence fluctuations.

To demonstrate the capability of the COIN method, fluorescence fluctuations were measured from the doublet line of atomic potassium excited by a light source consisting of two color pulses, derived from uncorrelated lasers whose spectrum is resonant with the atomic lines. FIG. 5 depicts the exponentially decaying oscillations of the measured fluorescence variance, with the inset showing the absolute value of the Fourier transform of the data points. The peak corresponds to the energy splitting of the potassium doublet (57.7 $cm^{-1}$), the two small side-bands being artifacts due to the 1 mm pitch of the mechanical lead-screw used in the motorized delay line).

While in the above, for reasons of clarity and simplicity, the interfering entities selected were light beams, the method according to the invention is suitable for other waves capable of interfering with each other, such as quantum probabilities of atomic or molecular excitations, electromagnetic waves, acoustic waves or transverse or longitudinal waves.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for performing interference measurements by observation of interference noise, comprising the steps of:
   splitting an energy beam from an energy source into two beams directed into two different arms of an interferometer;
   using variable delay-generating means to introduce a path difference between said two arms;
   introducing a variable random phase difference between said two arms, and
   recombining said two energy beams into a single beam.

2. The method as claimed in claim 1, wherein said introduced random phase difference is of a magnitude of between 0 and $2\pi$.

3. The method as claimed in claim 1, wherein said random phase difference is produced in the form of an additional path difference.

4. (Amended) The method as claimed in claim 1, wherein said random phase difference is produced by said delay-generating means.

5. The method as claimed in claim 1, wherein said random phase difference is produced by controlled or uncontrolled environmental fluctuations.

6. The method as claimed in claim 1, as used for the measurement of an energy source autocorrelation, comprising the further steps of:

detecting the intensity of said single recombined beam as a function of time, for varying delays;

analyzing the intensity fluctuations produced at any given nominal delay;

deriving a statistical measure of said fluctuations, and recording said statistical measure as a function of said delay.

7. The method as claimed in claim 6, wherein said statistical measure is the variance.

8. The method as claimed in claim 1, wherein said energy beam is a light beam.

9. The method as claimed in claim 6, wherein said energy source consists of a known source of a known spectrum and an unknown source wherein the autocorrelation of said energy source is used for the measurement of the spectrum of said unknown source.

10. The method as claimed in claim 8, as used for the measurement of spectra, comprising the further steps of:

passing said single, recombined beam through a sample cell containing the sample the spectrum of which is to be measured;

collecting the signal from said cell;

detecting the intensity of said signal as a function of time, for varying delays;

analyzing the intensity fluctuations of said signal at any given nominal delay;

deriving a statistical measure of said fluctuations, and recording said statistical measure as a function of said delay.

11. An apparatus for performing interference measurements by observation of interference noise, comprising:

a beam splitter in which an energy beam from an energy source is split into two arms;

a variable delay unit in which a variable delay is imposed on one of said two arms;

a constant delay unit imposing a constant delay on the other one of said two arms;

a recombiner in which said two arms are recombined to form a single output beam;

characterized in that a phase randomizer is interposed between said constant delay unit or said variable delay unit and said recombiner to introduce a variable phase difference between said two arms.

12. The apparatus as claimed in claim 11, wherein said phase randomizer is a dedicated phase randomizer.

13. The apparatus as claimed in claim 11, further comprising a detector receiving signals from said recombiner and feeding said signals to a fluctuation analyzer for analysis.

14. The apparatus as claimed in claim 11, wherein said energy source is a light source.

15. The apparatus as claimed in claim 11, wherein said energy source is a pulsed or continuous laser, an incandescent bulb or other incoherent source, or light originating in several independent coherent or incoherent sources.

16. The apparatus as claimed in claim 14, further comprising:

an internal energy source for providing said energy beam to be split;

a sample cell receiving energy from said recombiner for accommodating a substance the spectrum of which is to be analyzed, and an energy collector for receiving the fluorescence produced by said substance in said cell to be transferred to said detector.

17. The apparatus as claimed in claim 13, further comprising computer means for receiving and displaying the results from said fluctuation analyzer and for controlling said variable delay unit.

18. The apparatus as claimed in claim 11, wherein said energy source consists of a known source of a known spectrum, internal or external to the apparatus, and an unknown source.

* * * * *